(12) United States Patent
Kuo

(10) Patent No.: US 6,866,777 B2
(45) Date of Patent: Mar. 15, 2005

(54) LAMINATED MODULAR WATER FILTER

(76) Inventor: Joseph Kuo, No. 20, Industrial Park 7th Rd., Taichung City (TW)

(*) Notice: Subject to any disclaimer, the term of this patent is extended or adjusted under 35 U.S.C. 154(b) by 124 days.

(21) Appl. No.: 10/287,170

(22) Filed: Oct. 31, 2002

(65) Prior Publication Data

US 2003/0075492 A1 Apr. 24, 2003

Related U.S. Application Data

(63) Continuation-in-part of application No. 10/000,539, filed on Oct. 19, 2001, now Pat. No. 6,613,226.

(51) Int. Cl.[7] .......................................... B01D 25/164
(52) U.S. Cl. ..................... 210/225; 210/229; 210/231; 210/333.01; 210/347; 210/486
(58) Field of Search ................ 210/224–229, 210/231, 321, 75, 321.84, 333.01, 346, 347, 455, 456, 486–488, 492

(56) References Cited

U.S. PATENT DOCUMENTS 4,695,380 A * 9/1987 Hilgendorff et al. ........ 210/347
5,536,405 A * 7/1996 Myrna et al. .......... 210/321.75

* cited by examiner

Primary Examiner—Matthew O. Savage
(74) Attorney, Agent, or Firm—Christensen O'Connor Johnson Kindness PLLC

(57) ABSTRACT

A laminated modular water filter includes superposed annular plates. A filter unit is disposed between each adjacent pair of the annular plates. The annular plates include a top plate, a bottom plate, a plurality of intermediate plates, and at least one flow-guiding plate sandwiched between two of the intermediate plates. Each of the top plate, the intermediate plates, and the bottom plate has an annular outer passage unit in fluid communication with a curved outer passage unit in the flow-guiding plate. Dirty water is introduced into two side openings in the top plate, and flows into central holes in the annular plates via the filter units so as to form filtered water. Solid particles in the dirty water are guided into two side openings in the bottom plate via the annular outer passage units and the curved outer passage unit.

4 Claims, 8 Drawing Sheets

LAMINATED MODULAR WATER FILTER

CROSS-REFERENCE TO RELATED APPLICATION

This application is a continuation-in-part (CIP) of U.S. patent application Ser. No. 10/000,539, filed by the applicant on Oct. 19, 2001 now U.S. Pat. No. 6,613,226, the entire disclosure of which is incorporated herein by reference.

BACKGROUND OF THE INVENTION

1. Field of the Invention

This invention relates to a water filter, and more particularly to a laminated modular water filter.

2. Description of the Related Art

In the parent application, the applicant discloses a laminated modular water filter that is used to filter dirty water and that includes a plurality of superposed annular plates and a plurality of filter units, each of which is disposed between an adjacent pair of the annular plates to prevent passage of solid particles therethrough. In use, the solid particles are deposited on the filter units in a relatively even manner. As such, it is necessary to replace all of the filter units at one time after a period of use, which is uneconomical.

SUMMARY OF THE INVENTION

An object of this invention is to provide a laminated modular water filter that includes a plurality of filter units and a flow-guiding plate, which guides solid particles in dirty water onto the lowermost ones of the filter units so that only the lowermost ones of the filter units are needed to be replaced after use, there by resulting in low usage costs.

According to this invention, a laminated modular water filter includes a plurality of superposed annular plates. A filter unit is disposed between each adjacent pair of the annular plates. The annular plates include a top plate, a bottom plate, a plurality of intermediate plates, and at least one flow-guiding plate sandwiched between two of the intermediate plates. The top plate overlies the uppermost one of the intermediate plates. The lowermost one of the intermediate plates overlies the bottom plate. Each of the top plate, the intermediate plates, and the bottom plate has an annular outer passage unit in fluid communication with a curved outer passage unit in the flow-guiding plate. Dirty water is introduced into two side openings in the top plate, and flows into central holes in the annular plates via the filter units so as to form filtered water. When the water to be processed is comparatively dirty, the number of the intermediate plates and the filter units can be increased. Solid particles in the dirty water are guided into two side openings in the bottom plate via the annular outer passage units and the curved outer passage unit. As such, solid particles in the dirty water are concentrated on the lowermost ones of the filter units, which are disposed under the flow-guiding plate and which are to be replaced after the water filter is used for a long period of time.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
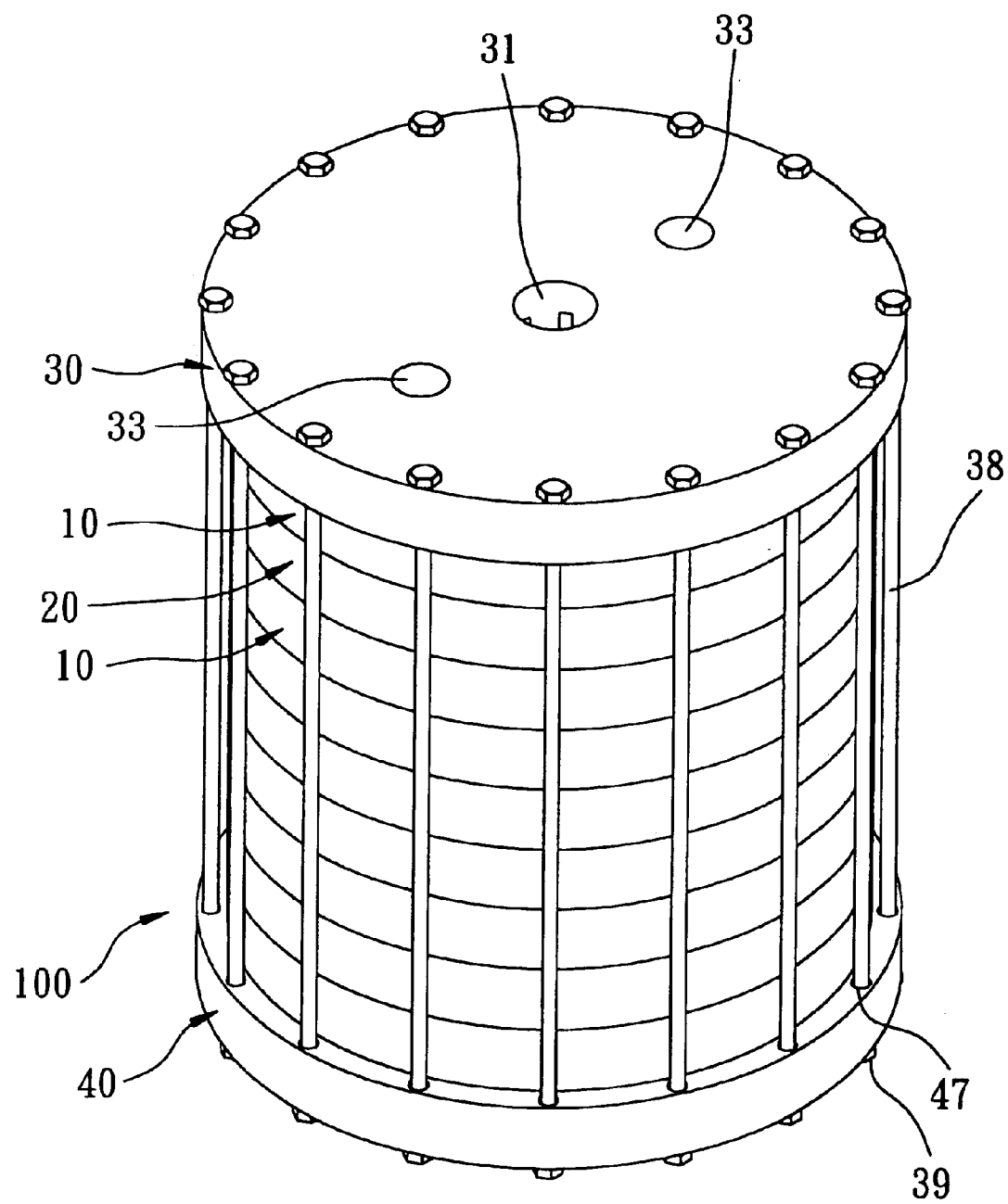
FIG. 1 is an assembled perspective view of the preferred embodiment of a laminated modular water filter according to this invention.
Figure 2:
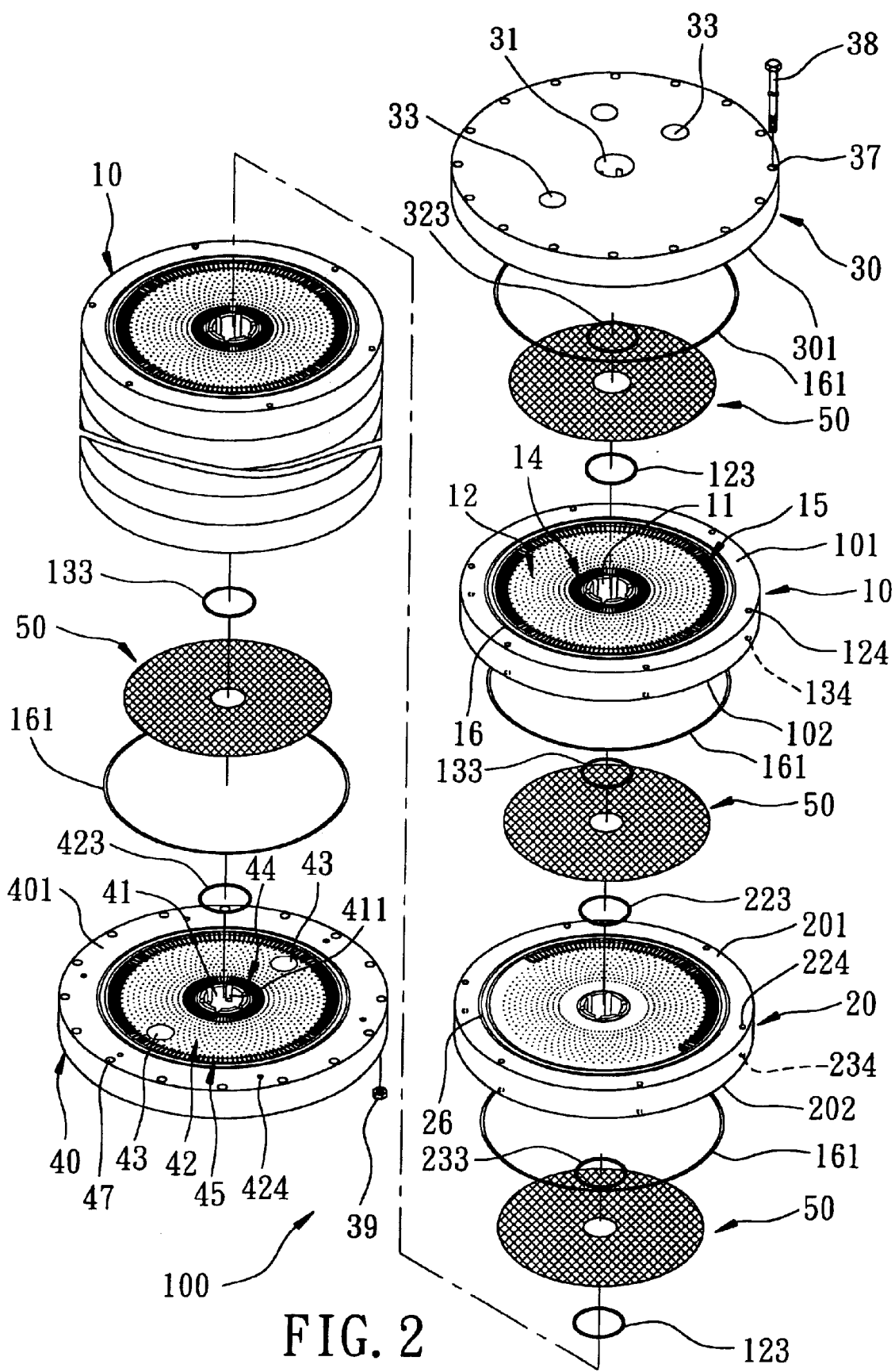
FIG. 2 is an exploded perspective view of the preferred embodiment.
Figure 5:
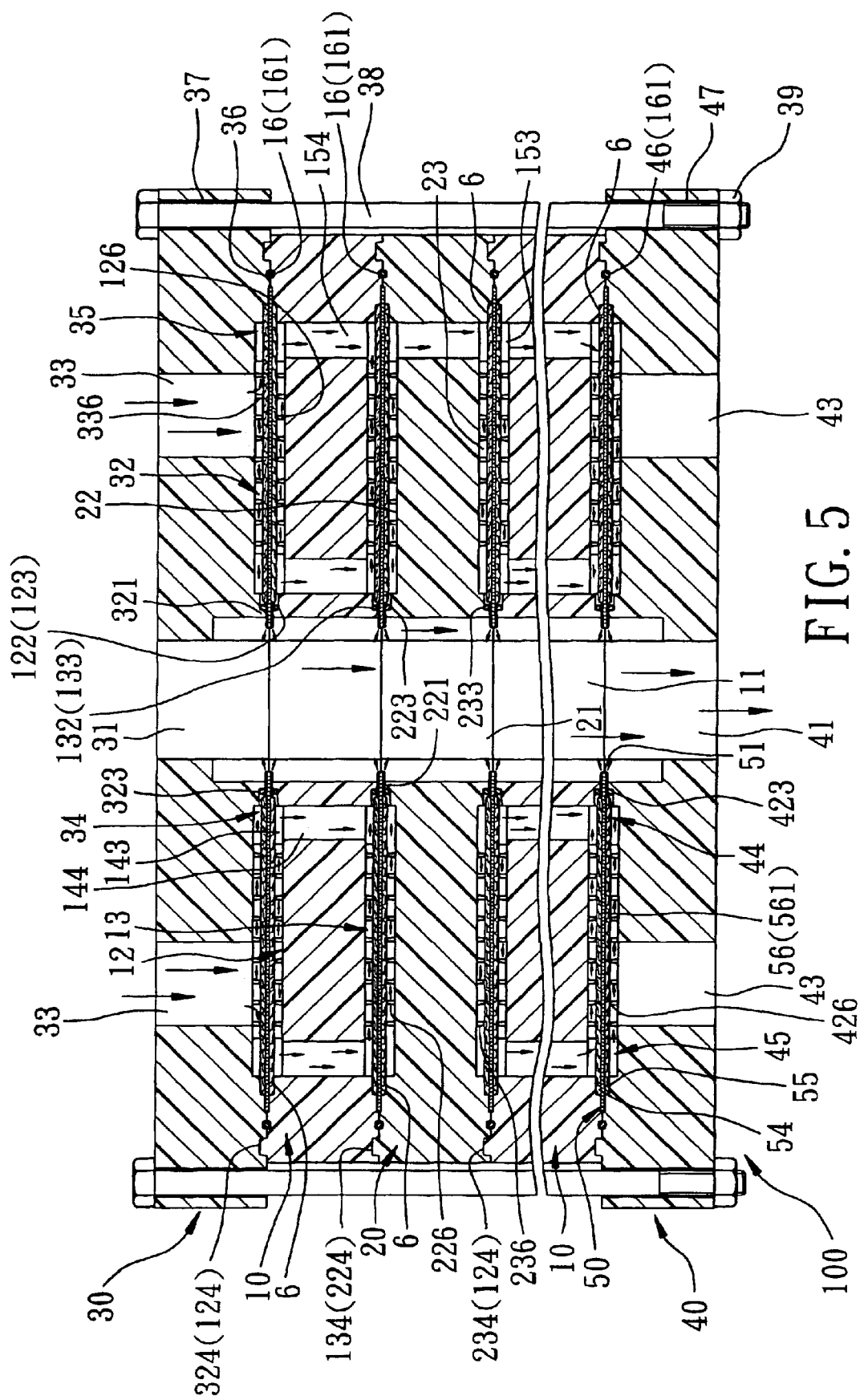
FIG. 5 is a sectional view of the preferred embodiment.

Referring to FIGS. 1, 2, and 5, the preferred embodiment of a laminated modular water filter 100 according to this invention is shown to include a plurality of superposed annular plates and a plurality of laminated filter units 50. The annular plates are interconnected detachably by means of a plurality of bolts 38 (only one is shown in FIG. 2) and a plurality of nuts 39 (only one is shown in FIG. 2). Each adjacent pair of the annular plates clamp a respective one of the filter units 50 therebetween. The annular plates include a plurality of intermediate plates 10, a flow-guiding plate 20 sandwiched between an adjacent pair of the intermediate plates 10, a top plate 30 overlying the uppermost intermediate plate 10, and a bottom plate 40 abutting against and disposed under the lowermost intermediate plate 10. The main difference between this invention and the parent application (i.e. U.S. patent application Ser. No. 10/000,539) resides in that no flow-guiding plate 20 is provided in the parent application.

Each of the intermediate, top and bottom plates 10, 30, 40 and the flow-guiding plate 20 is made of rubber, and has a central hole 11, 31, 41, 21. The central holes 11, 31, 41, 21 in the intermediate, top and bottom plates 10, 30, 40 and the flow-guiding plate 20 are in fluid communication with one another, as shown in FIG. 5. The bolts 38 extend through fastener holes 37, 47 in the top and bottom plates 30, 40, and engage respectively the nuts 39, thereby interconnecting detachably the intermediate, top and bottom plates 10, 30, 40 and the flow-guiding plate 20.

Figure 3:
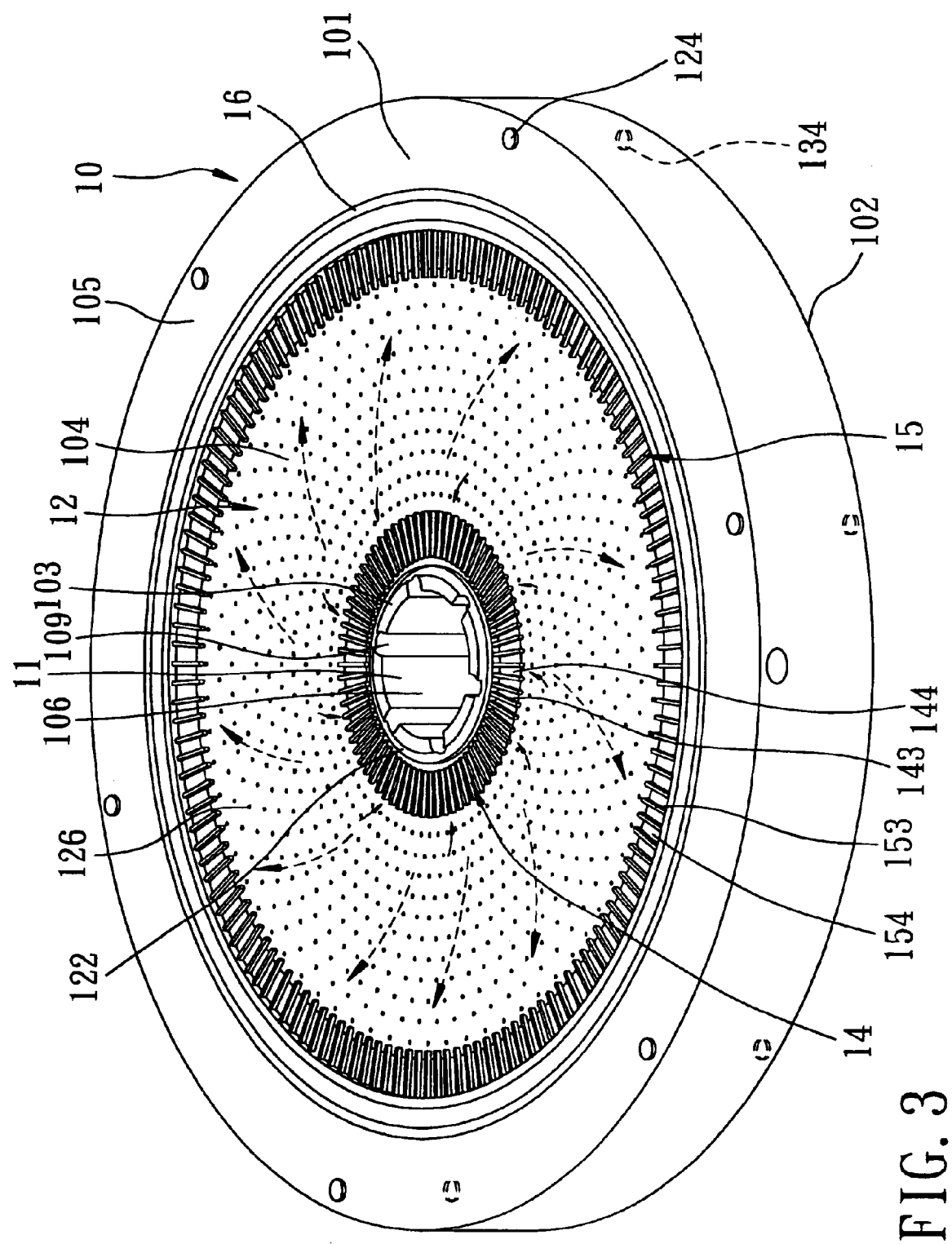
FIG. 3 is a perspective view of an intermediate plate of the preferred embodiment.
Figure 3A:
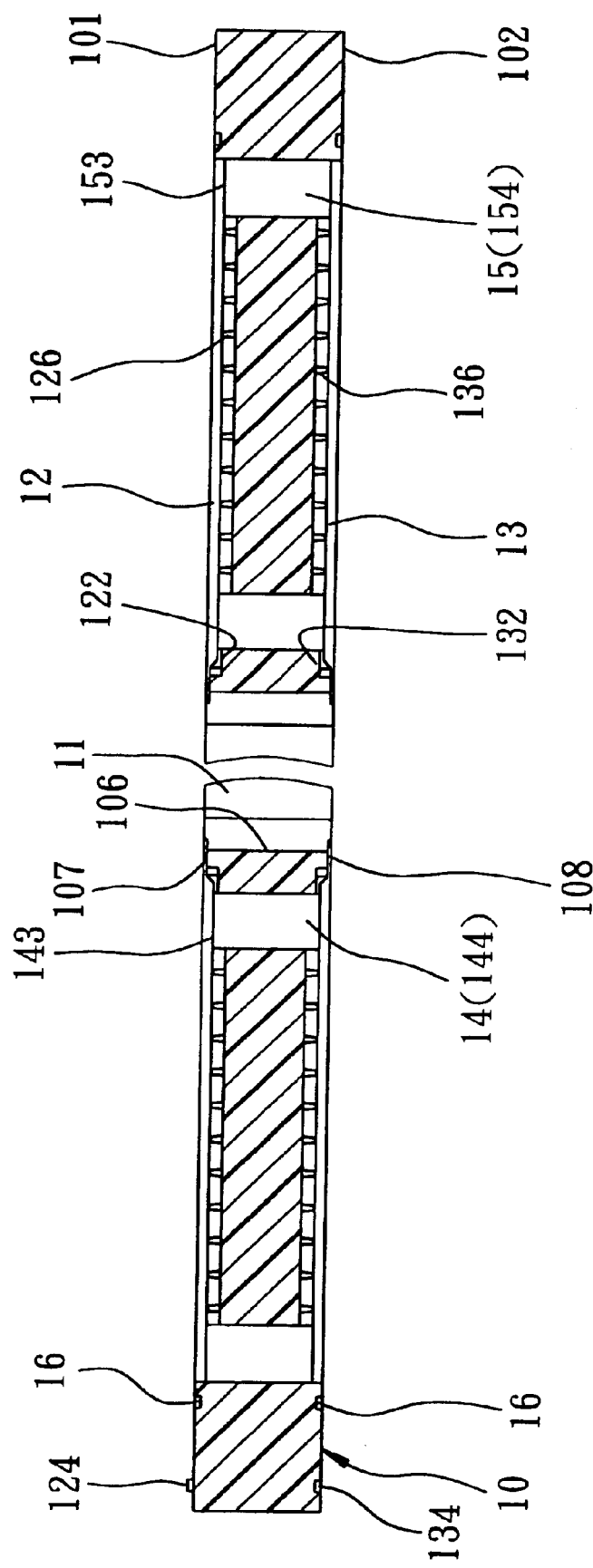
FIG. 3A is a sectional view of the intermediate plate of the preferred embodiment.

As best shown in FIGS. 3 and 3A, each of the intermediate plates 10 includes a top surface 101 with an annular upper groove 12, a bottom surface 102 with an annular lower groove 13, an annular inner passage unit 14, and an annular outer passage unit 15. Each of the inner passage units 14 is formed through the respective intermediate plate 10, and has an upper end that is in fluid communication with an inner peripheral portion of the upper groove 12 in the respective intermediate plate 10, and a lower end that is in fluid communication with an inner peripheral portion of the lower groove 13 in the respective intermediate plate 10. Each of the outer passage units 15 is formed through the respective intermediate plate 10, and has an upper end that is in fluid communication with an outer peripheral portion of the upper groove 12 in the respective intermediate plate 10, and a lower end that is in fluid communication with an outer peripheral portion of the lower groove 13 in the respective intermediate plate 10.

Figure 4:
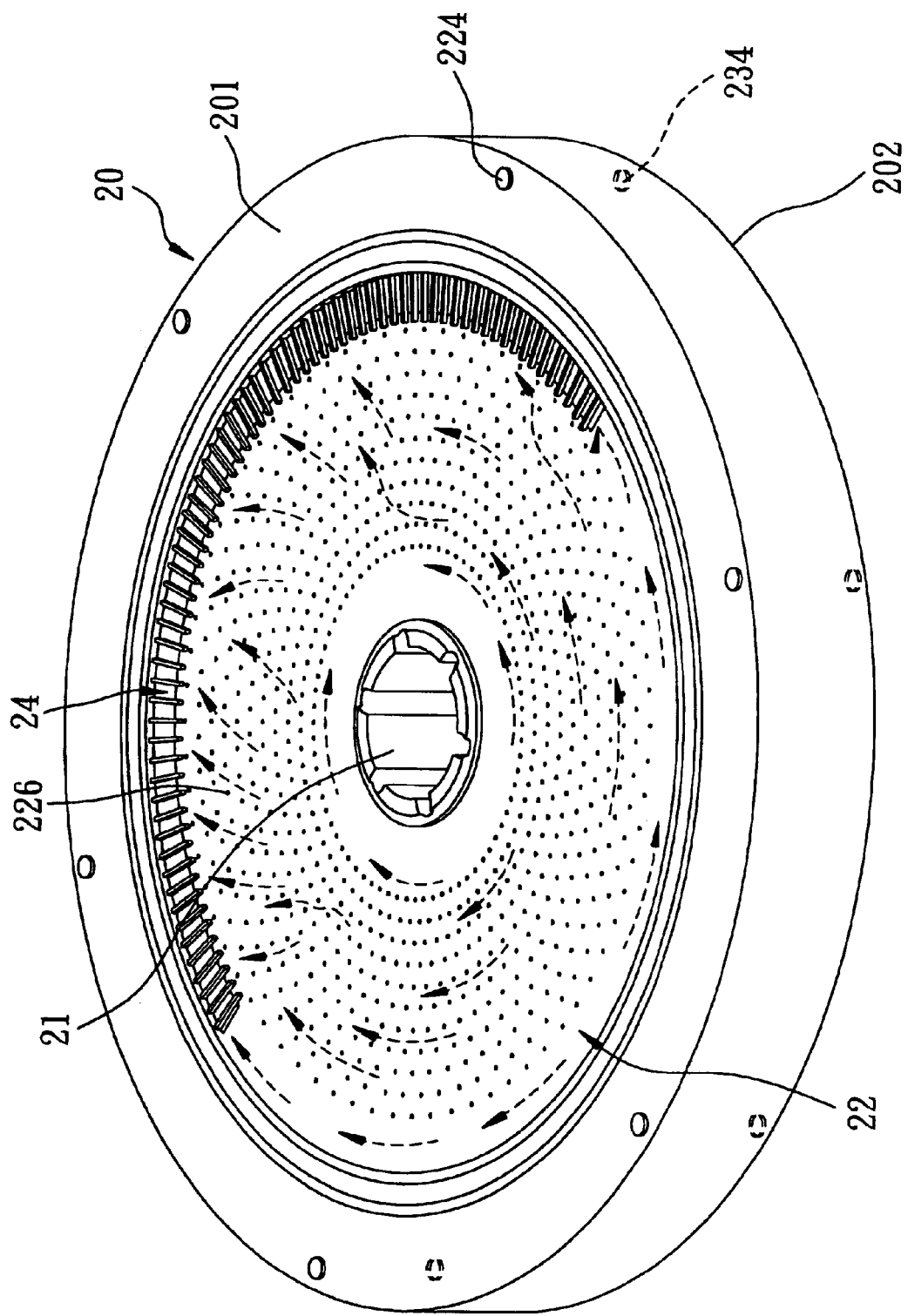
FIG. 4 is a perspective view of a flow-guiding plate of the preferred embodiment.

Referring to FIGS. 2 and 4, the flow-guiding plate 20 is similar to the intermediate plates 10 in construction except that the flow-guiding plate 20 is not provided with any inner passage unit, and includes a curved outer passage unit 24, which extends along a circumferential direction of the flow-guiding plate 20, and which has two ends that are angularly spaced apart from each other by an angle of 180 degrees. Like the intermediate plates 10, the flow-guiding plate 20 includes a top surface 201 that is formed with an annular upper groove 22, and a bottom surface 202 that is formed with an annular lower groove 23.

Referring back to FIGS. 1, 2, and 5, the top plate 30 has two side openings 33 that are located on two sides of the central hole 31 and that are in fluid communication with the outer passage units 15 in the intermediate plates 10, and a bottom surface 301 that is formed with an annular lower groove 32, an annular inner passage unit 34 aligned with the inner passage units 14 in the intermediate plates 10, and an annular outer passage unit 35 aligned with the outer passage units 15 in the intermediate plates 10. The inner and outer passage units 34, 35 are not formed through the top plate 30.

The bottom plate 40 has a top surface 401 with an annular upper groove 42, two side openings 43 that are located on two sides of the central hole 41 and that are in fluid communication with the outer passage units 15 in the intermediate plates 10, an annular inner passage unit 44 aligned with the inner passage units 14 in the intermediate plates 10, and an annular outer passage unit 45 aligned with the outer passage units 15 in the intermediate plates 10. The inner and outer passage units 44, 45 are formed in the top surface 401, and are not formed through the bottom plate 40.

The upper grooves 12, 42, 22 in the intermediate and bottom plates 10, 40 and the flow-guiding plate 20 are aligned with the lower grooves 13, 32, 23 in the intermediate and top plates 10, 30 and the flow-guiding plate 20. Each adjacent pair of the intermediate, top and bottom plates 10, 30, 40 and the flow-guiding plate 20 define an annular accommodating space 6 therebetween, which is formed cooperatively by the respective upper groove 12, 42, 22 and the respective lower groove 13, 32, 23 so as to receive the respective filter unit 50 fittingly therein.

Each of the top and bottom surfaces 101, 102 of the intermediate plates 10, the bottom surface 301 of the top plate 30, and the top surface 401 of the bottom plate 40 is formed with an annular slot 16, 36, 46. Each adjacent pair of the intermediate, top and bottom plates 10, 30, 40 and the flow-guiding plate 20 clamp an O-ring 161 therebetween, which is received within the corresponding slot 16, 36, 46, 26 so as to establish a liquid-tight seal around the corresponding filter unit 50. Each of the filter units 50 includes two annular filter films 54, 55 that are received fittingly within the corresponding accommodating space 6 and that are interconnected fixedly along outer peripheral portions thereof, and a filter net 56 that is sandwiched between the filter films 54, 55 so as to define an annular filtered-water passage 561 between the filter films 54, 55. The filtered-water passages 561 have inner peripheries that are in fluid communication with the central holes 11, 31, 41 in the intermediate, top and bottom plates 10, 30, 40. Each of the upper and lower grooves 12, 13, 22, 23, 32, 42 is provided with a seal ring 123, 133, 223, 233, 323, 423 that is disposed in an inner periphery thereof, that abuts against an inner periphery of the respective filter film 54, 55, and that is disposed between the corresponding filter film 54, 55 and a corresponding one of the intermediate, top and bottom plates 10, 30, 40 and the flow-guiding plate 20.

When it is desired to filter dirty water, the openings 43 in the bottom plate 40 are closed. Subsequently, dirty water is forced into the openings 33 in the top plate 30, e.g. by means of a pump (not shown), so as to flow into the annular outer passage units 15 in the intermediate plates 10. Because the inner passage units 14 are in fluid communication with the annular outer passage units 15 via the upper and lower grooves 12, 13, the dirty water flows from the upper and lower grooves 12, 13 and the inner and outer passage units 14, 15 into the filtered-water passages 561, thereby forming filtered water. The filtered water is forced from the filtered-water passages 561 into the central holes 11, 31, 41, 21 in the intermediate, top and bottom plates 10, 30, 40 and the flow-guiding plate 20, thereby flowing out of the water filter 100 through the central hole 41 in the bottom plate 40.

Figure 6:
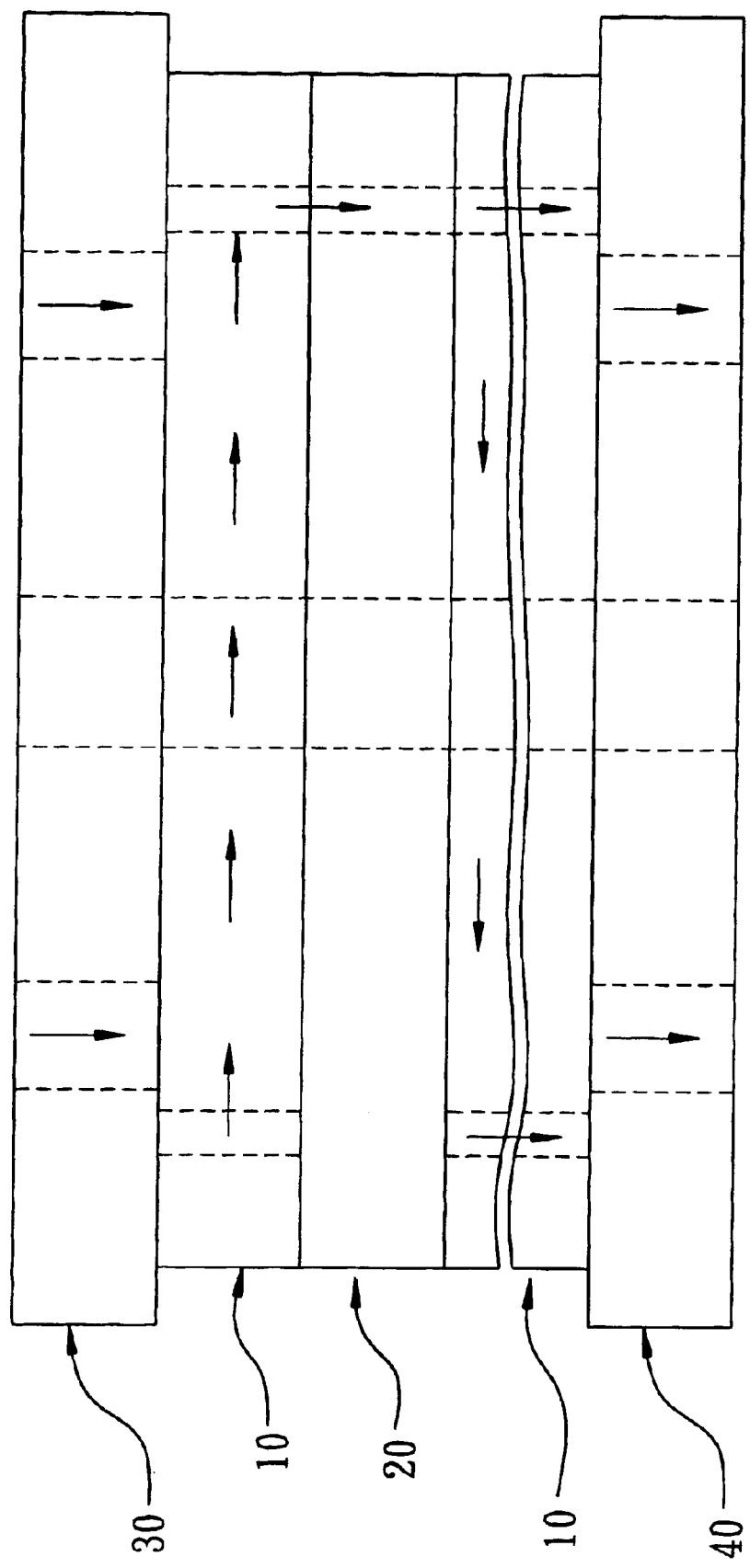
FIG. 6 illustrates the flow path of the water to be filtered in the preferred embodiment.
Figure 7:
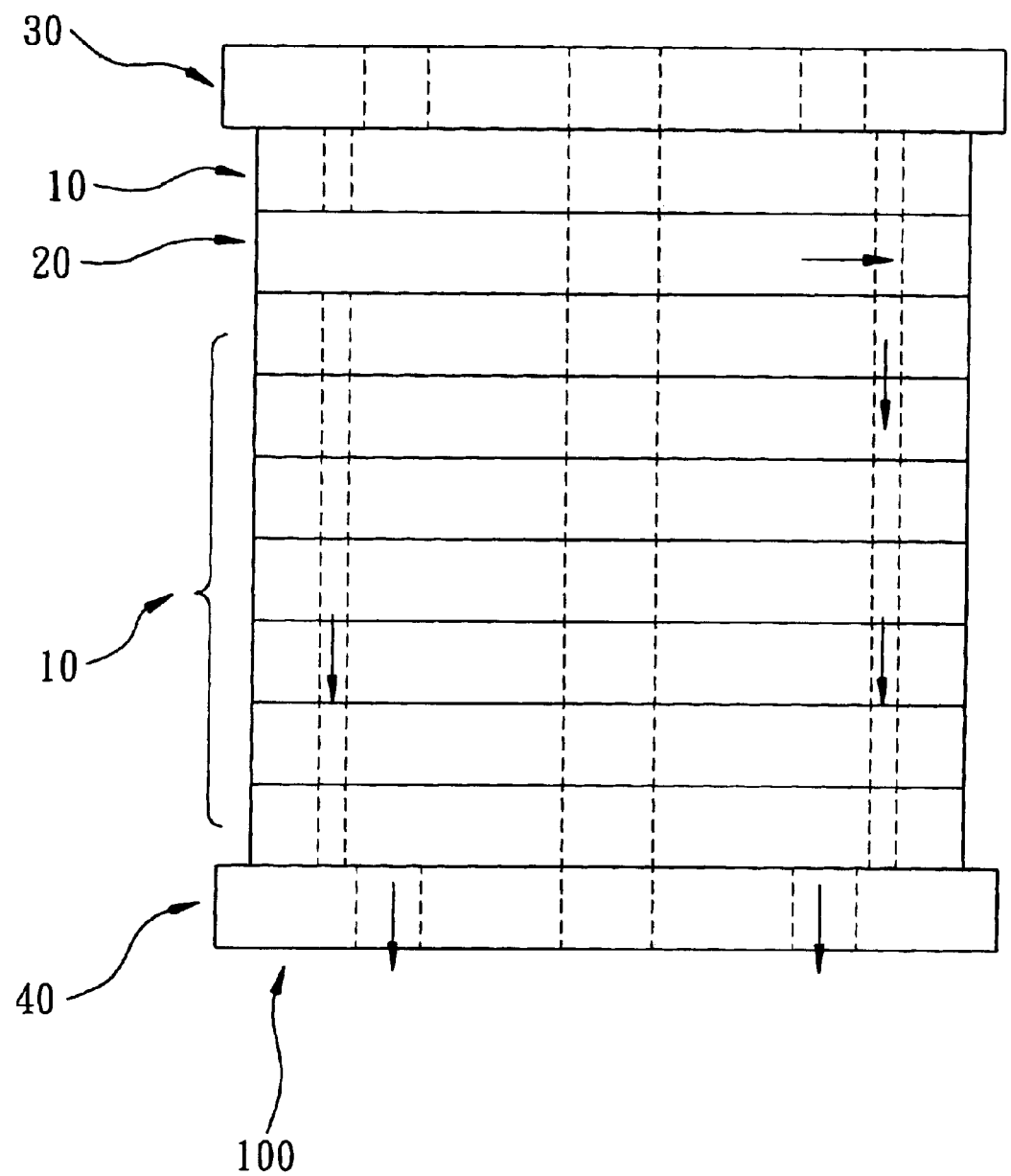
FIG. 7 illustrates the flow path of unfiltered water in the preferred embodiment.

Referring to FIGS. 5 and 6, since the outer passage unit 24 in the flow-guiding plate 20 is curved, water will flow along the top surface 201 of the flow-guiding plate 20 in one direction, and along the bottom surface 202 of the flow-guiding plate 20 in the opposite direction. As such, solid particles in the dirty water are guided onto the lowermost ones of the filter units 50, which are disposed under the flow-guiding plate 20. The openings 43 in the bottom plate 40 can be opened to permit flow of the dirty water from the water filter 100 therethrough. The number of the flow-guiding plate 20 can be increased.

Referring once again to FIGS. 3 and 3A, each of the intermediate plates 10 includes an annular inner plate portion 103, an annular intermediate plate portion 104, an annular outer plate portion 105, a plurality of angularly equidistant inner vertical plates 143, and a plurality of angularly equidistant outer vertical plates 153. Each of the inner plate portions 103 defines the central hole 11 in the respective intermediate plate 10. Each of the intermediate plate portions 104 is disposed around the respective inner plate portion 103. Each of the outer plate portions 105 is disposed around the respective intermediate plate portion 104. The outer vertical plates 153 extend integrally and radially between the intermediate and outer plate portions 104, 105. The inner vertical plates 143 extend integrally and radially between the inner and intermediate plate portions 103, 104. Each adjacent pair of the inner vertical plates 143 define a radial inner passage 144 therebetween. The inner passages 144 cooperatively constitute the inner passage unit 14. Each adjacent pair of the outer vertical plates 153 define a radial outer passage 154 therebetween. The outer passages 154 cooperatively constitute the outer passage unit 15. Each of the filter units 50 has an outer peripheral portion that is clamped between the outer vertical plates 153 of an upper one of an adjacent pair of the annular plates 10, 20, 30, 40 and the outer vertical plates 153 of a lower one of the adjacent pair of the annular plates 10, 20, 30, 40, and an inner peripheral portion that is clamped between the inner vertical plates 143 of the upper one of the adjacent pair of the annular plates 10, 20, 30, 40 and the inner vertical plates 143 of the lower one of the adjacent pair of the annular plates 10, 20, 30, 40.

Each of the inner plate portions 103 is formed with a plurality of integral flanges 106 that are spaced circumferentially apart from each other, and two annular slots 122, 132 that are formed respectively in top and bottom surfaces of the respective inner plate portion 103 between the flanges 106 and the inner vertical plates 143 and that are in fluid communication with the inner passage unit 14 in the respective intermediate plate 10. Each of the slots 122, 132 receives the seal ring 123, 133 and the inner periphery of the corresponding filter unit 50 therein. Likewise, the seal ring 323 is disposed between the top plate 30 and the uppermost intermediate plate 10, while the seal ring 423 is disposed between the lowermost intermediate plate 10 and the bottom plate 40. The inner periphery of each of the filter units 50 is clamped between the corresponding two seal rings 123, 133, 223, 233, 323, 423, as shown in FIGS. 2 and 5.

Each of the flanges 106 has flat top and bottom surfaces 107, 108. The flanges 106 of each adjacent pair of the intermediate plates 10 abut against each other by engagement of the corresponding top surface 107 and the corresponding bottom surface 108. Each adjacent pair of the flanges 106 define a space 109 therebetween, which is in fluid communication with the corresponding central hole 11 and the annular slots 122, 132.

Referring once again to FIGS. 2 and 5, each of the intermediate and bottom plates 10, 40 and the flow-guiding plate 20 is formed integrally with a plurality of upper posts 126, 426, 226 that extend upwardly therefrom and that are disposed within the corresponding upper grooves 12, 42, 22 so as to press against a bottom surface of the corresponding filter unit 50, thereby forming a turbulent water flow around each of the upper posts 126, 426, 226. Each of the intermediate and top plates 10, 30 and the flow-guiding plate 20 is formed integrally with a plurality of lower posts 136, 336, 236 that extend downwardly therefrom and that are disposed within the corresponding lower grooves 13, 32, 23 so as to press against a top surface of the corresponding filter unit 50, thereby forming a turbulent water flow around each of the lower posts 136, 336, 236.

Each adjacent pair of the intermediate, top and bottom plates 10, 30, 40 and the flow-guiding plate 20 are positioned relative to each other by engagement of a plurality of positioning posts 124, 424, 224, which are formed on the top surface of a corresponding one of the intermediate and bottom plates 10, 40 and the flow-guiding plate 20, with a plurality of positioning holes 134, 324, 234, which are formed in the bottom surface of a corresponding one of the intermediate and top plates 10, 30 and the flow-guiding plate 20.

Because the intermediate plates 10 can be easily removed from and mounted to the remaining parts of the water filter 100, when the water to be processed is comparatively dirty, the number of the intermediate plates 10, the seal rings 123, 133, the O-rings 161, and the filter units 50 can be increased accordingly.

With this invention thus explained, it is apparent that numerous modifications and variations can be made without departing from the scope and spirit of this invention. It is therefore intended that this invention be limited only as indicated by the appended claims.

I claim:

1. A water filter for filtering dirty water having a plurality of suspended solid particles, said water filter comprising:

an intermediate plate assembly including at least three annular intermediate plates and at least one annular flow-guiding plate, which are arranged one above another, each of said flow-guiding plate and said intermediate plates including a top surface with an annular upper groove, a bottom surface with an annular lower groove, and a central hole formed through a respective one of said flow-guiding plate and said intermediate plates, said central holes in each adjacent pair of said flow-guiding plate and said intermediate plates being aligned with and being in fluid communication with each other, each of said intermediate plates having an annular inner passage unit that is in fluid communication with said central hole, said upper groove, and said lower groove in a respective one of said intermediate plates, and an annular outer passage unit formed therethrough and having an upper end that is in fluid communication with an outer peripheral portion of said upper groove in a respective one of said intermediate plates, and a lower end that is in fluid communication with an outer peripheral portion of said lower groove in the respective one of said intermediate plates, said flow-guiding plate being sandwiched between an adjacent pair of said intermediate plates and having a curved outer passage unit that is formed through said flow-guiding plate, that extends along a circumferential direction of said flow-guiding plate, and that is in fluid communication with said annular outer passage units in the adjacent pair of said intermediate plates;

an annular top plate superposed on an uppermost one of said intermediate plates and having a bottom surface with an annular lower groove that is aligned with said upper and lower grooves in said flow-guiding plate and said intermediate plates, a central hole formed through said top plate and in fluid communication with said central holes in said flow-guiding plate and said intermediate plates, and two side openings aligned with and in fluid communication with said annular outer passage unit in the uppermost one of said intermediate plates and adapted to permit introduction of the dirty water to be filtered therethrough;

an annular bottom plate, on which a lowermost one of said intermediate plates is superposed, said bottom plate having a top surface with an annular upper groove that is aligned with said upper and lower grooves in said intermediate plates, each adjacent pair of said top, intermediate and bottom plates and said flow-guiding plate defining an annular accommodating space therebetween, which is formed cooperatively by a respective one of said upper grooves in said intermediate and bottom plates and said flow-guiding plate and a respective one of said lower grooves in said top and intermediate plates and said flow-guiding plate so that the dirty water can flow from said side openings in said top plate into said central holes in said top and intermediate plates and said flow-guiding plate through said inner passage units in said intermediate plates, a central hole formed through said bottom plate and in fluid communication with said central holes in said intermediate plates, and two side openings in said bottom plate aligned with and in fluid communication with said annular outer passage unit in the lowermost one of said intermediate plates;

a plurality of laminated filter units disposed respectively within a respective one of said accommodating spaces, each of said filter units including two water-permeable annular filter films that are received fittingly within the respective one of said accommodating spaces and that are interconnected fixedly along outer peripheral portions thereof, and an annular filter net that is sandwiched between said filter films so as to define an annular filtered-water passage between said filter films, thereby preventing flow of the solid particles into said filtered-water passage via said filter films, said filtered-water passages having inner peripheries that are in fluid communication with said central holes in said intermediate plates so as to permit water flow between said central holes in said intermediate plates and said filtered-water passages, the dirty water being capable of being forced into said openings in said top plate when said openings in said bottom plate are closed such that the dirty water flows into said filtered-water passages along a flow path of said annular outer passage units in said intermediate plates and said curved outer passage unit in said flow-guiding plate, said upper and lower grooves in said top, intermediate and bottom plates, and said filter films, thereby forming filtered water, which in turn flows out of said water filter through said central hole in said bottom plate; and means for connecting said intermediate plates removably to said top and bottom plates and said flow-guiding plate;

whereby, when said side openings in said bottom plate are opened, the dirty water can flow out of said water filter through said side openings in said bottom plate.

2. The water filter as claimed in claim 1, wherein said curved outer passage unit in said flow-guiding plate has two ends that are angularly spaced apart from each other by an angle of 180 degrees.

3. The water filter as claimed in claim 2, wherein said inner passage unit of each of said intermediate plates includes:

an upper end in fluid communication with an inner peripheral portion of said upper groove in the respective one of said intermediate plates;

a lower end in fluid communication with an inner peripheral portion of said lower groove in the respective one of said intermediate plates; and an inner periphery in fluid communication with said central hole in the respective one of said intermediate plates, said inner passage units in each adjacent pair of said intermediate plates which abut against each other being aligned with and being in fluid communication with each other.

4. The water filter as claimed in claim 3, wherein each of said filter units has an inner peripheral portion and an outer peripheral portion, each of said intermediate plates being made of rubber, and including:

an annular inner plate portion defining said central hole in the respective one of said intermediate plates therein;

an annular intermediate plate portion disposed around said inner plate portion;

an annular outer plate portion disposed around said intermediate plate portion;

a plurality of angularly equidistant, inner vertical plates extending integrally and radially between said inner and intermediate plate portions, each adjacent pair of said inner vertical plates defining a radial inner passage therebetween, said radial inner passages cooperatively constituting a corresponding one of said inner passage units, said inner vertical plates of each adjacent pair of said intermediate plates clamping said inner peripheral portion of a respective one of said filter units therebetween; and a plurality of angularly equidistant, outer vertical plates extending integrally and radially between said intermediate and outer plate portions, each adjacent pair of said outer vertical plates defining a radial outer passage therebetween, said radial outer passages cooperatively constituting a corresponding one of said annular outer passage units, said outer vertical plates of each adjacent pair of said intermediate plates clamping said outer peripheral portion of the respective one of said filter units therebetween.

\* \* \* \* \*